(12) United States Patent
McCuller

(10) Patent No.: US 7,546,492 B2
(45) Date of Patent: Jun. 9, 2009

(54) REMOTELY REPAIRING FILES BY HIERARCHICAL AND SEGMENTED CYCLIC REDUNDANCY CHECKS

(75) Inventor: Patrick McCuller, San Diego, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 711 days.

(21) Appl. No.: 11/317,496

(22) Filed: Dec. 22, 2005

(65) Prior Publication Data

US 2007/0168708 A1 Jul. 19, 2007

(51) Int. Cl.
*G06F 11/00* (2006.01)

(52) U.S. Cl. .......................... 714/52; 714/755

(58) Field of Classification Search ............... 714/52, 714/755

See application file for complete search history.

(56) References Cited

U.S. PATENT DOCUMENTS

| | | | |
|---|---|---|---|
| 6,049,612 A | | 4/2000 | Fielder et al. |
| 6,073,250 A | * | 6/2000 | Luby et al. ............... 714/6 |
| 6,625,754 B1 | * | 9/2003 | Aguilar et al. ............ 714/15 |
| 2001/0043616 A1 | * | 11/2001 | Hild et al. ................. 370/477 |
| 2003/0033214 A1 | | 2/2003 | Mikkelsen et al. |
| 2005/0091568 A1 | * | 4/2005 | Levy et al. ................. 714/755 |
| 2005/0204353 A1 | | 9/2005 | Ji et al. |
| 2008/0136586 A1 | * | 6/2008 | Backes et al. ............. 340/5.8 |

OTHER PUBLICATIONS http://www.open-content.net/specs/draft-jchapweske-thex-02.html#anchor2.
http://vip.poly.edu/memon/pdf/delta.pdf.
http://domino.watson.ibm.com/library/cyberdig.nsf/papers/9ADD5F942230D4585256E3500578D88/$File/rj10305.pdf.
International Search Report and Written Opinion issued in PCT/US06/62239 on Mar. 20, 2008.
Graefe, Goetz, "Query evaluation techniques for large databases", In ACM Computing Surveys [online] (CSUR), vol. 25, Issue 2, (Jun. 1993), pp. 73-169, 1993, [retrieved on Sep. 1, 2007]. Retrieved from the Internet: <URL:http://www.cse.iitb.ac.in/~maloo/dp/queryeval-large-db.pdf>.

* cited by examiner

*Primary Examiner*—Bryce P Bonzo
(74) *Attorney, Agent, or Firm*—Samuel S. Lee; Procopio, Cory, Hargreaves & Savitch LLP

(57) ABSTRACT

A method, comprising: recursively generating a sequence of sections of check codes of a local corrupted file to produce a local repair file; selectively retrieving at least one part of a remote repair file and at least one part of a remote original file, based on differences between at least one part of the local repair file and the at least one part of a remote repair file, to identify at least one corrupted part of the local corrupted file; and replacing the at least one corrupted part of the local corrupted file with the at least one part of the remote original file.

69 Claims, 10 Drawing Sheets

BITS TWIDDLED $A_{original}$     abcdefghijk
$A_{corrupted}$    bacdefghijk

FIG. 6A

BITS MISSING $A_{original}$     bacdefghijk
$A_{corrupted}$    aghijk

FIG. 6B

BITS ADDED $A_{original}$     abcdefghijk
$A_{corrupted}$    abbbbbbbcdefghijk

FIG. 6C

COMBINATIONS

BITS TWIDDLED & MISSING $A_{original}$     abcdefghijk
$A_{corrupted}$    bacdefgh

OR $A_{original}$     abcdefghijk
$A_{corrupted}$    fghkij

FIG. 6D

BITS TWIDDLED & ADDED $A_{original}$     abcdefghijk
$A_{corrupted}$    bacdefqqqghijk

OR $A_{original}$     abcdefghijk
$A_{corrupted}$    qbcdefghijkq

FIG. 6E

REMOTELY REPAIRING FILES BY HIERARCHICAL AND SEGMENTED CYCLIC REDUNDANCY CHECKS

BACKGROUND

The present invention relates to remotely repairing files, and more specifically, to using hierarchical and segmented cyclic redundancy checks (CRC) to repair files.

In a typical application, a remote server stores a large inventory of files, one or more of which may be of interest to a local client. When the client requests and/or pays for information stored in the inventory of files, the remote server can transmit the file of interest to the local client. Thus, the server and the client maintain identical copies of the file of interest. However, the client copy of the file may become corrupted as a result of hardware and/or software malfunction, user error, or transmission error.

One reliable way to correct a corrupted file is to replace the entire file. Oftentimes, the file may be very large, e.g., in excess of 100 MB or more. This makes the process of transferring a replacement file over an existing transmission channel, such as the Internet, expensive and time consuming.

Conventional techniques, such as Rsync, exist which can handle, among other duties such as patching, the correction of a corrupted file. However, the cost of these techniques can be very expensive because the cost can include running and maintaining a sophisticated client-server protocol and the servers necessary to implement them, heavy bi-directional network traffic, security implications, and so on.

SUMMARY

Implementations of the present invention provide methods, apparatus, and programs for remotely repairing files using hierarchical and segmented check codes.

In one implementation, a method for remotely repairing files includes: recursively generating a sequence of sections of check codes of a local corrupted file to produce a local repair file; selectively retrieving at least one part of a remote repair file and at least one part of a remote original file, based on differences between at least one part of the local repair file and the at least one part of a remote repair file, to identify at least one corrupted part of the local corrupted file; and replacing the at least one corrupted part of the local corrupted file with the at least one part of the remote original file.

In another implementation, a system for remotely repairing files includes: a first check code generator to recursively generate a sequence of sections of check codes of a local corrupted file to produce a local repair file; a corruption identifier to selectively retrieve at least one part of a remote repair file and at least one part of a remote original file, based on differences between at least one part of the local repair file and the at least one part of a remote repair file, to identify at least one corrupted part of the local corrupted file; and a replacing unit to replace the at least one corrupted part of the local corrupted file with the at least one part of the remote original file.

In another implementation, a computer program, stored in a tangible storage medium, for repairing a local corrupted file, is disclosed. The program comprises executable instructions that cause a computer to: recursively generating a sequence of sections of check codes of a local corrupted file to produce a local repair file; selectively retrieving at least one part of a remote repair file and at least one part of a remote original file, based on differences between at least one part of the local repair file and the at least one part of a remote repair file, to identify at least one corrupted part of the local corrupted file; and replacing the at least one corrupted part of the local corrupted file with the at least one part of the remote original file.

In yet another implementation, an apparatus for remotely repairing files includes: means for recursively generating a sequence of sections of check codes of a local corrupted file to produce a local repair file; means for selectively retrieving at least one part of a remote repair file and at least one part of a remote original file, based on differences between at least one part of the local repair file and the at least one part of a remote repair file, to identify at least one corrupted part of the local corrupted file; and means for replacing the at least one corrupted part of the local corrupted file with the at least one part of the remote original file.

BRIEF DESCRIPTION OF THE DRAWINGS

FIGS. 6A through 6E show different configuration of data bit corruptions.

DESCRIPTION

Implementations of the present invention provide methods, apparatus, and programs for remotely repairing files using hierarchical and segmented check codes.

In one implementation of the present invention, the remote file repair technique provides relatively quick repair of local files while requiring substantially less data to be transferred than the conventional technique. Furthermore, the transfer can use simple, existing data transfer protocols without requiring any special communication protocol or interactive software server.

Figure 1A:
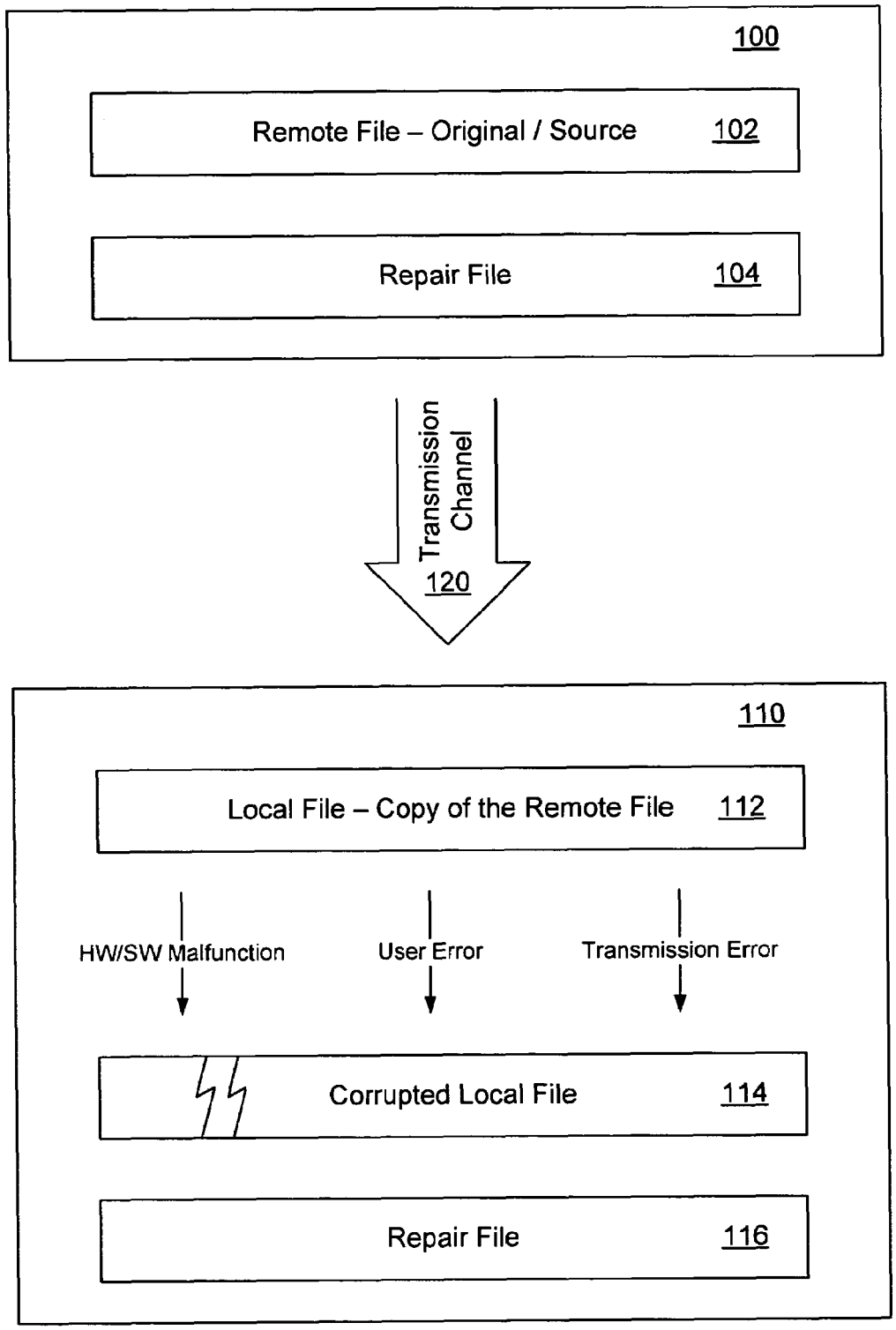
FIG. 1A is a block diagram of a file repair system according to one implementation of the present invention.

As illustrated in FIG. 1A, when a client 110 requests and/or pays for information stored in the inventory of files maintained by a remote storage unit such as a remote server 100, a file of interest 102 is transmitted to the client 110 using a transmission channel 120. Thus, the client 110 maintains a local copy 112 of the file that is identical to the file of interest 102 stored in the remote server 100. However, the local copy 112 of the file may become corrupted as a result of errors/malfunctions including hardware and/or software malfunction, user error, disk error, read error, virus infection, intentional alteration, transmission error, and/or other related errors/malfunctions. The client 110 may detect the file corruption by periodic checking, problems with execution, prompts from a server (such as for updates), check on execution, or check after a virus removal.

The local corrupted file is designated as 114 in FIG. 1. However, the local corrupted file 114 occupies substantially the same physical space as the local file 112.

To repair the local corrupted file 114, both the server 100 and the client compute repair files 104, 116 to support local self repair. To assess how to repair the local corrupted file 114, the client 110 requests from the remote server 100 only the information it needs to identify the corrupted part(s) of the file 114. The server 100 retrieves the requested information from the repair file 104 and transmits it to the client 110, which uses the received information to determine what part(s) of the file 114 is corrupted. Once the client 110 determines the corrupted part(s), the client requests the part(s) from the server 100. The server 100 retrieves the replacement part(s) from the original file 102 and transmits the part(s) to the client 110 to repair or restore the corrupted file 114 to the correct state.

In the above-described process, a relatively small number of bytes are transferred across the transmission channel 120, preserving valuable bandwidth and requiring shorter wait periods for users with low- or mid-bandwidth connections. In one implementation, the server 100 can compute the repair file 104 prior to transmitting the file of interest 102 to the client 110. In other implementations, the server 100 can compute the repair file 104 at any time including after receiving a request from the client 110 for transmission of part(s) of the repair file 104.

Figure 1B:
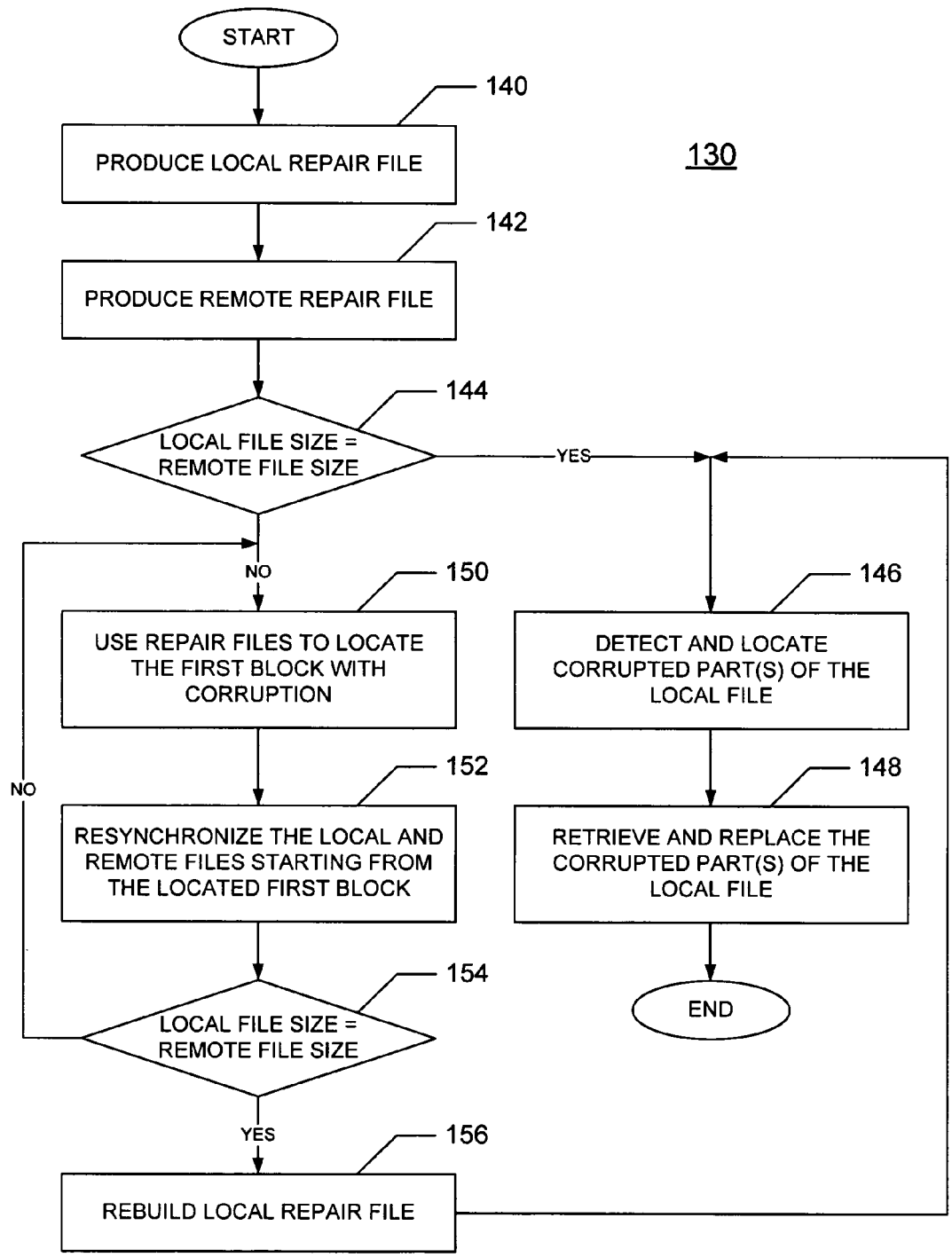
FIG. 1B illustrates a flowchart of a process for remotely repairing a corrupted file according to one implementation of the present invention.

FIG. 1B illustrates a flowchart 130 of a remote file repair process according to one implementation of the present invention. At box 140, a sequence of sections of check codes of the local corrupted file 114 is recursively generated to produce a local repair file 116. A sequence of sections of check codes of a remote original file 102 is then recursively generated, at box 142, to produce a remote repair file 104.

The size of the local file 114 is compared, at 144, to the size of the remote file 102. If the local file size matches the remote file size, corrupted part(s) of the local file 114 is detected and located, at box 146. The detection and location of the corrupted part(s) involve recursive comparison and retrieval of check codes in the repair files 104, 116. The corrupted part(s) of the local file is retrieved and replaced, at box 148. If the local file size does not match the remote file size (box 144), then the repair files 104, 116 are used, at box 150, to locate the first corrupted part of the local file 114 from the beginning of the file 114.

The local and remote files 114, 102 are resynchronized, at box 152, starting from the located first corrupted part of the local file 114. The resynchronization includes replacing missing data and/or dropping added data between the last correct part and the resynchronization point.

The size of the local file 114 is compared again, at 154, to the size of the remote file 102. If the local file size matches the remote file size, at box 154, then the local repair file 116 is rebuilt, at 156, and the process continues at box 146 to detect and locate the corrupted part(s) of the local file 114. If the local file size does not match the remote file size (box 154), then the repair files 104, 116 are used, at box 150, to locate the first corrupted part of the local file 114 from the current resynchronization point.

Figure 2:
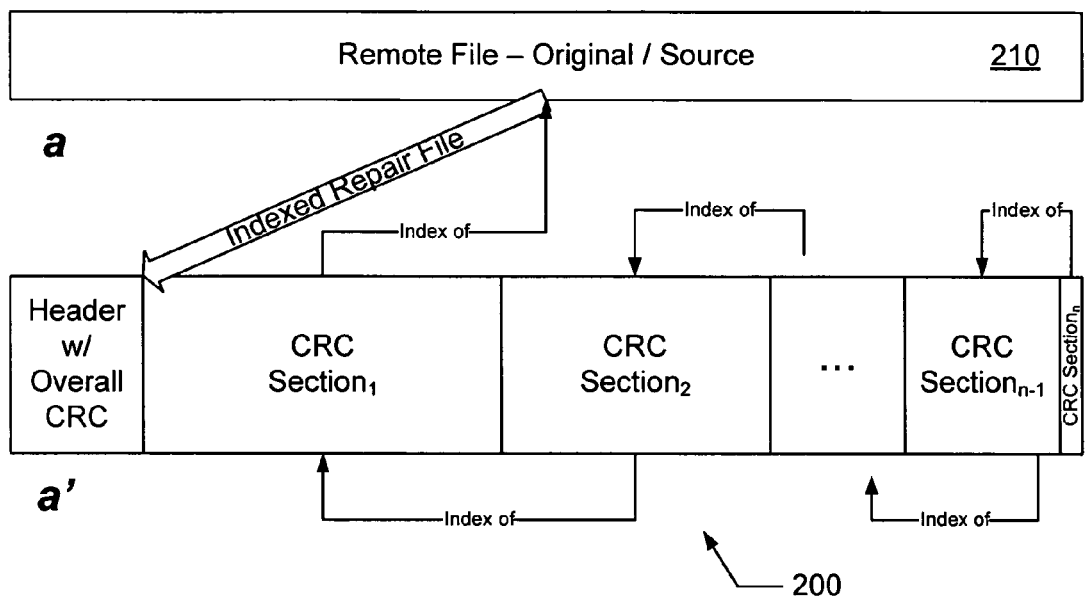
FIG. 2 illustrates one implementation of a "repair index file".
Figure 3:
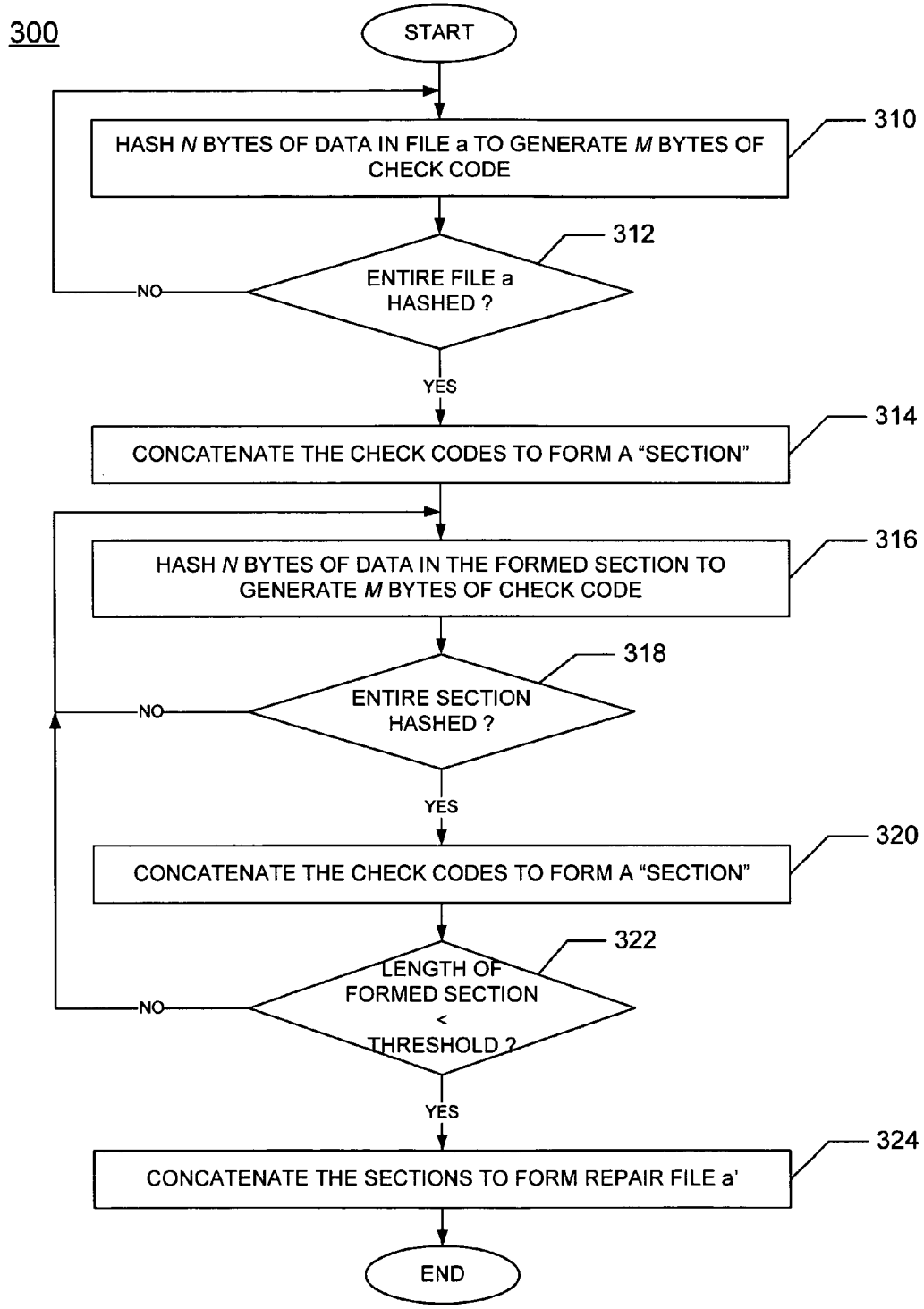
FIG. 3 is a flowchart illustrating a process of generating the repair index file.
Figure 4:
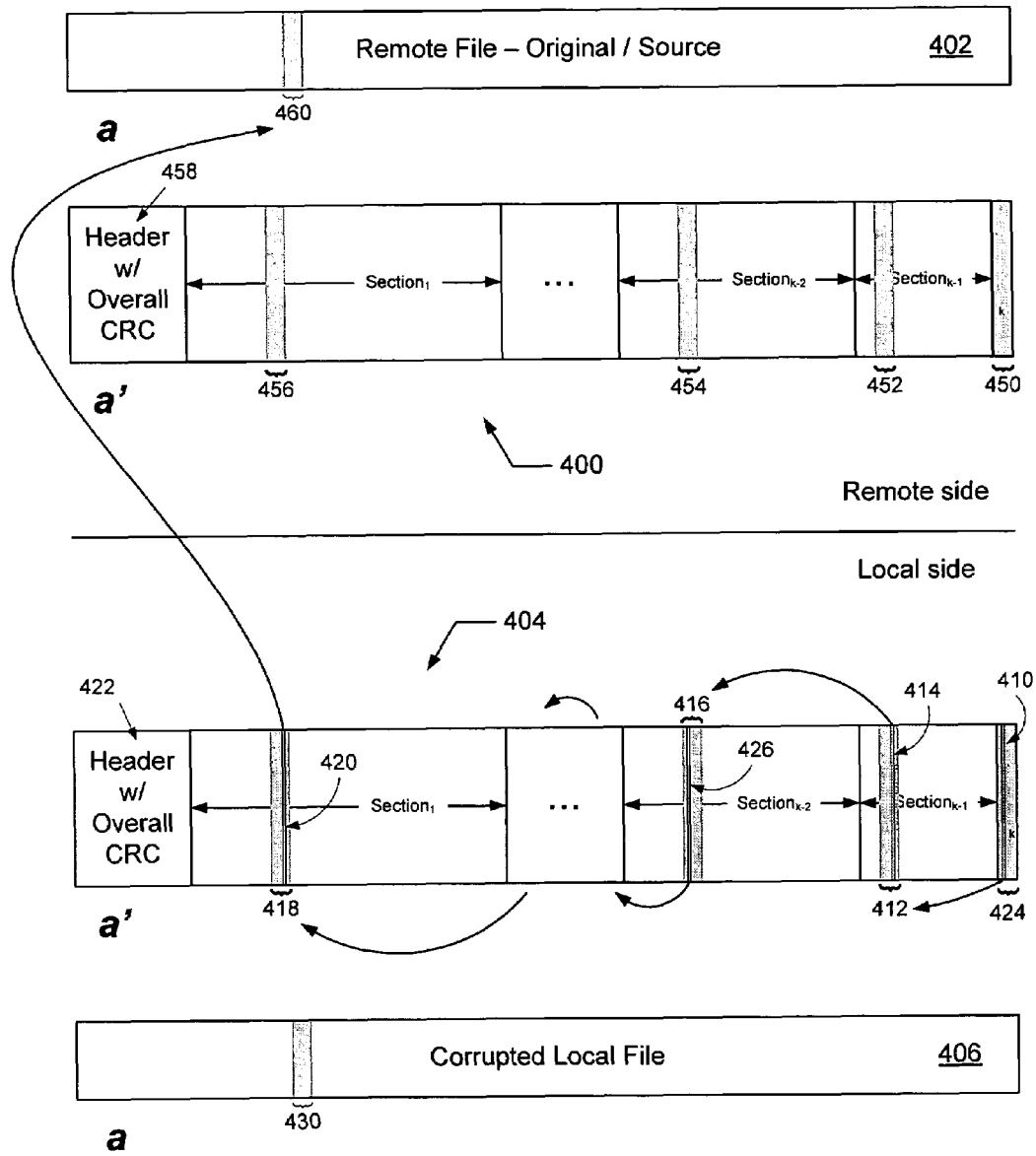
FIG. 4 shows one implementation of a process for using a repair index file by selectively retrieving part(s) of the file to identify and repair part(s) of the local corrupted file.
Figure 5:
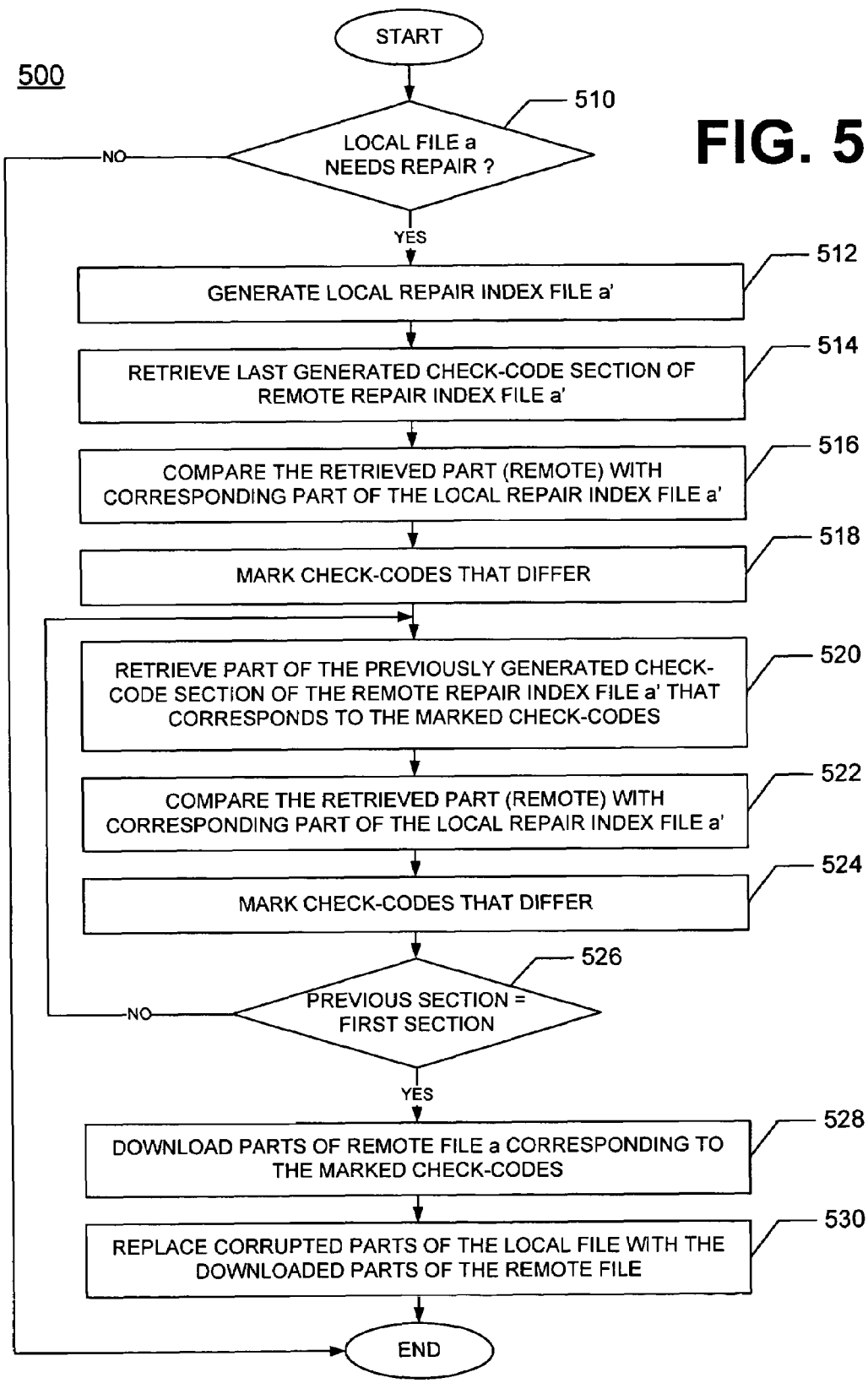
FIG. 5 a flowchart illustrating a process for using the repair index file.
Figure 7:
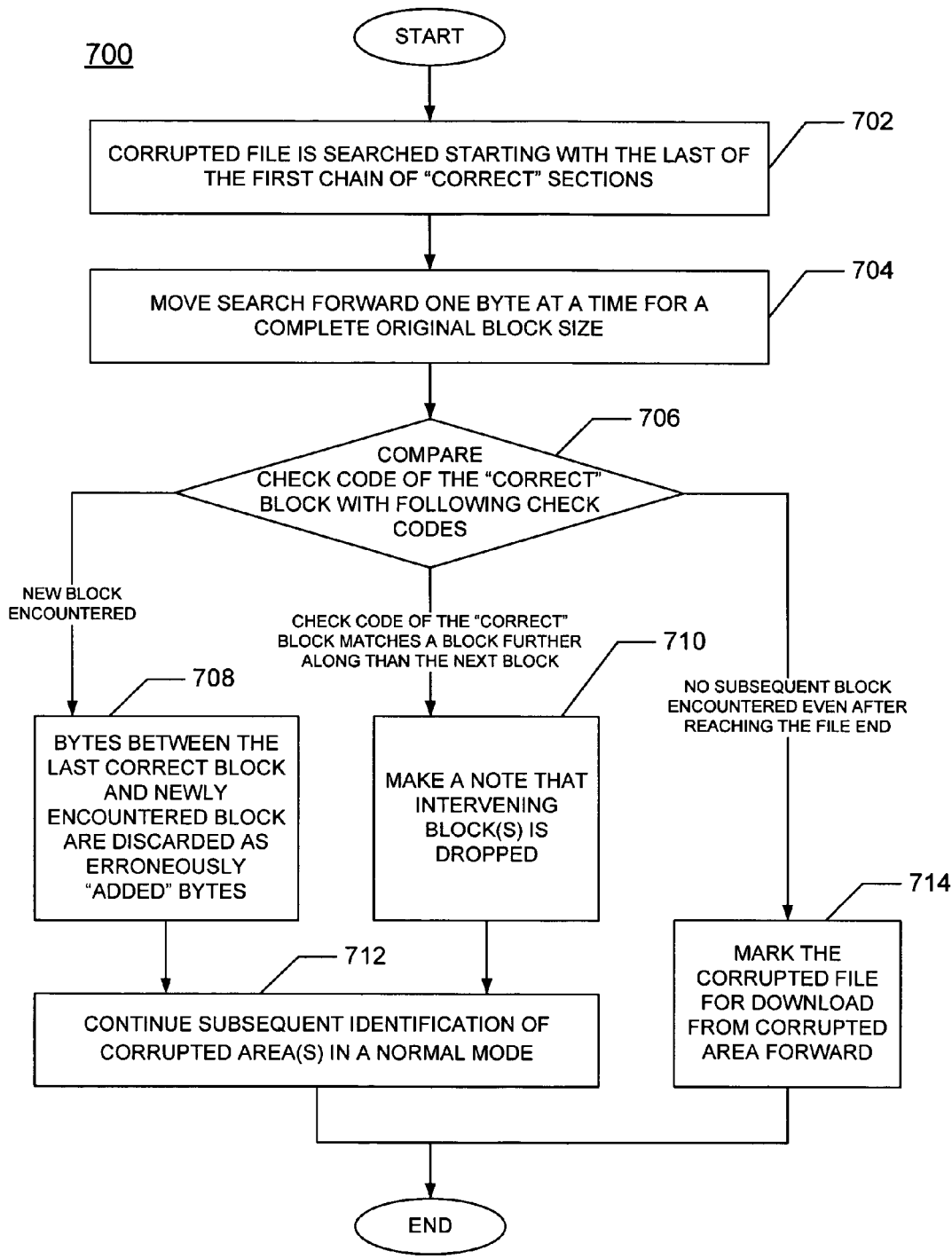
FIG. 7 shows a flowchart for identifying/isolating corrupted area(s) of a file.

The production of a remote repair file 104 (box 142) by recursively generating a sequence of sections of check codes of a remote original file 102 is described in detail below and is illustrated in FIGS. 2 and 3. A similar process can be used to produce a local repair file 116 by recursively generate a sequence of sections of check codes of a local corrupted file 114 (box 140). The detection and location of corrupted part(s) of the local file (box 146) is also described in detail below and is illustrated in FIGS. 4 and 5. The resynchronization of the local and remote files (box 152) is described in detail below and is illustrated in FIG. 7.

FIG. 2 illustrates one implementation of a "repair index file" 200. In one implementation, the repair index file 200 (a') is generated according to a flowchart 300 shown in FIG. 3.

Initially, an N byte block of the original file 210 (a) is hashed into an M byte check code, at box 310. In one implementation, an N:M block-to-check-code ratio of 100 to 1 provides an efficient ratio. In one example, a block is 2000 bytes long and a check code is 20 bytes long. In one implementation, check codes are implemented as cyclic redundancy check (CRC) codes. In another implementation, a check code is implemented as a secure 160-bit (20 byte) hash referred to as SHA-160. However, check codes can be implemented as other types of hashes.

A check is made, at box 312, to determine whether the entire file 210 has been hashed. If it is determined that the entire file has not yet been hashed, the process returns to box 310 to hash another block (i.e., N bytes) of the original file into another M byte check code. Otherwise, if it is determined that the entire file has been hashed, the hashed check codes are then concatenated, at box 314, to form a "section" (e.g., CRC Section$_1$ in FIG. 2), where M*k through M*(k+1)$^{th}$ bytes in the repair index file 200 are hashed check codes for N*k through N*(k+1)$^{th}$ bytes in the original file 210.

The steps of boxes 310, 312, 314 are repeated at boxes 316, 318, 320 with the concatenated check codes (e.g., CRC Section$_1$) being treated as source material for a new "section" of check codes (e.g., CRC Section$_2$). Thus, N bytes of the section formed at box 314 are hashed into an M byte check code, at box 316. A check is made, at box 318, to determine whether the entire section (e.g., CRC Section$_1$) has been hashed. If it is determined that the entire section has not yet been hashed, the process returns to box 316 to hash another N bytes of the formed section to generate another M byte check code. Otherwise, if it is determined that the entire section (e.g., CRC Section$_1$) has been hashed, the hashed check codes are then concatenated, at box 320, to form a new "section" (e.g., CRC Section$_2$), where M*k through M*(k+1)$^{th}$ bytes of the new section (e.g., CRC Section$_2$) are hashed check codes for N*k through N*(k+1)$^{th}$ bytes in the previous section (e.g., CRC Section$_1$).

At box 322, the length of the new concatenated section (formed at box 320) is compared to a threshold to ensure that the generated check codes in the new section are sufficiently small enough for an effective local file repair with a minimal number of data downloads from the server. If the length of the new section is longer than the threshold, the process returns to boxes 316, 318, 320 to generate another section of check codes using the new section as source material. In one implementation, a threshold is set at 2000 bytes so that a section of check codes equal to or less than 2000 bytes terminates the process. Therefore, the sections of the repair index file 200 are recursively generated until a threshold is satisfied. Finally, all sections are concatenated, at box 324, in production order to form the repair index file 200 (a'). In the illustrated implementation of FIG. 2, a check code (e.g., a CRC code) of the entire file 210 is calculated and concatenated at the beginning of the repair file 200 as a header for the repair file 200.

Although FIG. 2 illustrates one specific configuration of a repair file, different configurations including different sequences of sections of check codes are possible.

FIG. 4 shows one implementation of a process for using a repair index file 400 by selectively retrieving part(s) of the file 400 to identify and repair part(s) of the local corrupted file 406. In one implementation, the process for using the repair index file 400 by the client is illustrated in detail in a flowchart 500 shown in FIG. 5. In the illustrated implementations of FIG. 4 and FIG. 5, the client uses selectively retrieved parts of the repair index file 400 to identify and repair local corrupted file section(s) 430. The client performs efficient repair by conceptually breaking the corrupted file into successively smaller sections while searching for the smallest unit of corruption. In one implementation, small part(s) of the remote repair index file 400 can be selectively retrieved using the standard HTTP 1.1 protocol and a "Byte Range Retrieval" method described in http://www.w3.org/Protocols/rfc2616/rfc2616-sec14.html#sec14.35.

Initially, at box 510, a determination is made whether a local file 406 needs repair. In one implementation, this determination is made by calculating a CRC 422 of the local file 406. In some implementations, intermediate and parallel calculations of the CRC can be made and stored for possible future reference to reduce disk I/O requirements later on. If the calculated CRC 422 of the local file 406 matches the CRC 458 of the original file 402 in the server, the local file does not need repair. However, if the calculated CRC 422 of the local file 406 does not match the CRC 458 of the original file 402 in the server, the local file 406 is corrupted and needs repair. Boxes 512 to 526 in the flowchart 500 illustrate the repair process of isolating/identifying the corrupted areas 430 of the local file 406, retrieving the replacement part(s) 460 from the server, and repairing/correcting the corrupted areas 430 with the retrieved replacement part(s) (e.g., by replacement).

The client generates a repair file 404 of the local corrupted file 406, at box 512. The process for generating the repair file 404 of the local corrupted file 406 mirrors the generation of the remote repair index file 400 illustrated in FIG. 3.

Once the repair file 404 of the local corrupted file 406 has been generated, the last generated check code section (Section$_k$) 450 of the remote repair index file 400 is retrieved, at box 514. The retrieved section 450 is then compared, at box 516, with a corresponding section 424 of the local repair file 404. Check codes 410 within the section 424 that differ from check codes in the section 450 are marked at box 518.

The marked check codes 410 are used to retrieve, at box 520, part(s) 452 of previously generated section (Section$_{k-1}$) in the remote repair index file 400. The retrieved part(s) 452 is then compared, at box 522, with a corresponding part(s) 412 of Section$_{k-1}$ in the local repair file 404. Check codes 414 within the part(s) 412 that differ from check codes in the part(s) 452 are marked at box 524.

If it is determined, at box 526, that the previously generated check code section (i.e., Section$_{k-1}$) is not the first generated check code section (i.e., Section$_1$), then the process repeats starting at box 520. That is, the steps of retrieving 520, comparing 522, and marking 524 are recursively repeated until part(s) of every check code sections have been examined. Thus, marked check codes 414 are used to retrieve, at box 520, part(s) 454 of the check code section (i.e., Section$_{k-2}$) in the remote repair index file 400. The part(s) 454 retrieved in box 520 is compared, at box 522, with a corresponding part(s) 416 in Section$_{k-2}$ of the local repair file 404.

Once it is determined that the previously generated check code section is the first generated check code section (i.e., Section$_1$), the part(s) 460 of the original file 402 in the server that corresponds to the marked check code 420 in the first section is downloaded, at box 528, to the client. Finally, the downloaded part(s) 460 of the original file in the server is used to replace, at box 530, the corrupted part(s) 430 of the local file 406.

Referring again to FIG. 4, data in the local copy 406 of the original file 402 can become corrupted in several different ways. For example, as shown in FIGS. 6A through 6E, data bits are corrupted by being "twiddled", "missing", "added", or affected in any combination thereof.

In one example shown in FIG. 6A, data bits are corrupted by being "twiddled", where the data bits in the corrupted file 406 are either rearranged with only bits that were in the original file 402 or rearranged with foreign bits that were not in the data bits of the original file 402. Thus, the same number of data bits may be added and dropped, and the lengths of the data bits in the files remain the same.

In another example shown in FIG. 6B, data bits are corrupted by being "missing", where the data bits in the corrupted file 406 are missing bits that were in the original file 402. Thus, the number of data bits in the corrupted file 406 is less than the number of data bits in the original file 402.

In another example shown in FIG. 6C, data bits are corrupted by being "added", where the data bits in the corrupted file 406 include additional bits that were not in the original file 402. Thus, the number of data bits in the corrupted file 406 is more than the number of data bits in the original file 402.

In another example shown in FIG. 6D, data bits are corrupted by a combination of bits being twiddled and dropped. Thus, in the illustrated example of FIG. 6D, the data bits of the corrupted file 406 are: (1) rearranged only with bits in the original file 402; (2) rearranged with foreign bits that were not in the data bits of the original file 402; and (3) missing bits that were in the original file 402. Thus, the number of data bits in the corrupted file 406 is less than the number of the data bits in the original file 402.

In another example shown in FIG. 6E, data bits are corrupted by a combination of bits being twiddled and added. Thus, in the illustrated example of FIG. 6E, the data bits of the corrupted file 406: (1) are rearranged only with bits in the original file 402; (2) are rearranged with foreign bits that were not in the data bits of the original file 402; and/or (3) include additional bits that were not in the original file 402. Thus, the number of data bits in the corrupted file 406 is more than the number of the data bits in the original file 402.

FIG. 7 shows a flowchart 700 for identifying/isolating corrupted area(s) when the data bits are corrupted by being "missing", "added", or affected in any combination thereof. Accordingly, when the size of the local corrupted file and the size of the remote original file do not match (i.e. the bits are "missing" and/or "added"), the local corrupted file is searched starting with the last of the first chain of "correct" sections, at box 702. The search moves forward one byte at a time, at box 704, using a complete original block size of data by assuming that the current block, starting from the new position on byte forward and continuing for an original block size unless the end of the file is within that space, is a "correct" block. At box 706, the check code for the assumed correct block is compared with following check codes. In an alternative implementation, the search can be performed using sub-block-size chunks. However, it must be realized that the smaller the block size, the smaller the gain in download efficiency.

When a new block is encountered as a result of the comparison (made at box 706), bytes between the last correct block and the newly encountered block are discarded as erroneously "added" bytes, at box 708. Otherwise, when the check code of the assumed correct block matches a block further along than the next block as a result of the comparison (made at box 706), a note is made, at box 710, that intervening block(s) is dropped. Thus, once a subsequent block is encountered and the "missing" or "added" bits have been appropriately processed, subsequent identification/isolation of the corrupted area(s) of the remainder of the file continues in a normal mode, at box 712, which assumes that bits are "twiddled". Otherwise, when no subsequent block is encountered even after reaching the end of the file or a threshold for continued testing is encountered because of calculation or time constraints, the corrupted file is marked for download, at 714, from the corrupted area forward.

Figure 8A:
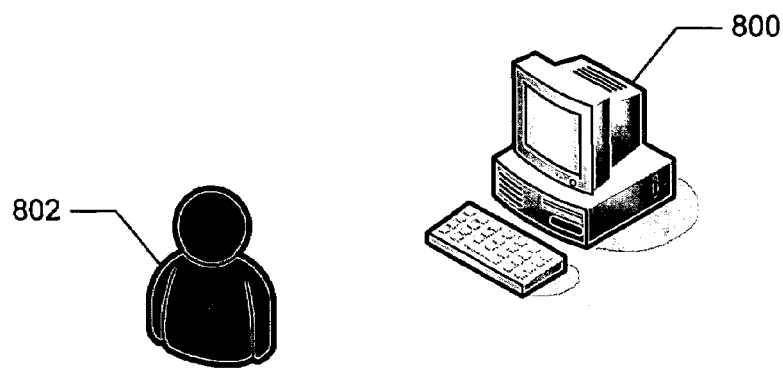
FIG. 8A shows a representation of a computer system and a user.

FIG. 8A shows a representation of a computer system 800 and a user 802. The user 802 can use the computer system 800 to generate remote and/or local repair files and to use the repair files to identify and repair part(s) of the local corrupted file. In one example, a computer system stores and executes a repair file generating application program (a repair file generator). The repair file generator 815 is designed to generate remote and/or local repair files and to use the repair files to identify and repair part(s) of the local corrupted file as described above.

Figure 8B:
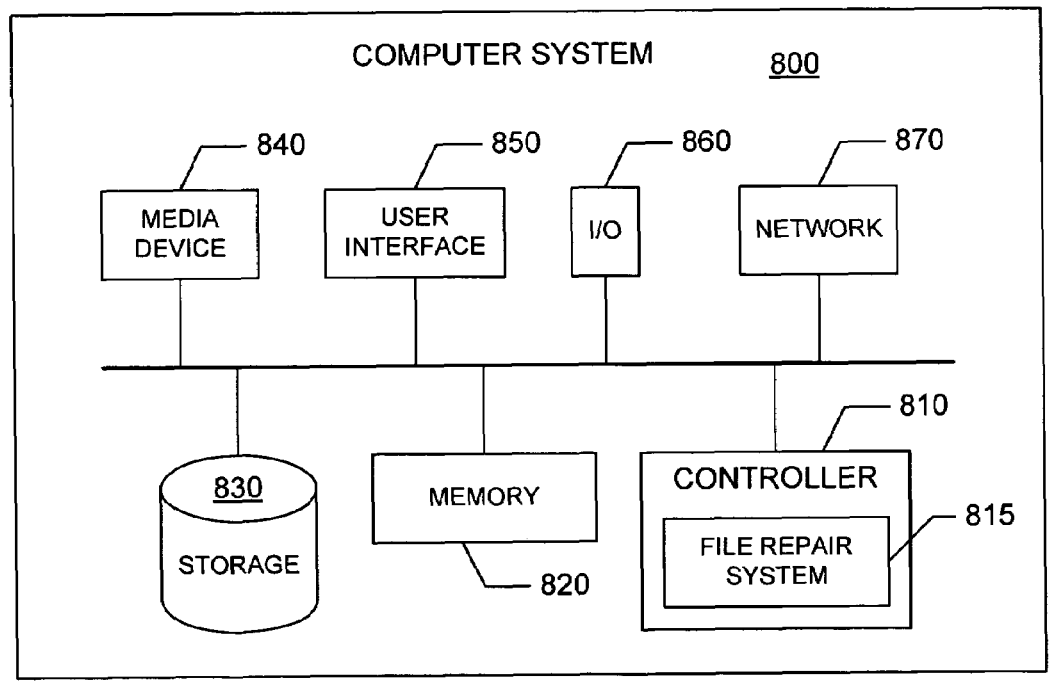
FIG. 8B shows a block diagram of one implementation of the computer system in FIG. 8A, including a repair file generator.

FIG. 8B shows a block diagram of one implementation of the computer system 800 in FIG. 8A, including a repair file generator. The computer system 800 includes a controller 810, a memory 820, storage 830, a media device 840, a user interface 850, an input/output (I/O) interface 860, and a network interface 870. These components are interconnected by a common bus 880. Alternatively, different connection configurations can be used, such as a star pattern with the controller at the center.

The controller 810 is a programmable processor and controls the operation of the computer system 800 and its components. The controller 810 loads instructions from the memory 820 or an embedded controller memory (not shown) and executes these instructions to control the system. In its execution, the controller 810 provides a repair file generator 815 as a software system. Alternatively, this service can be implemented as separate components in the controller 810 or the computer system 800. The repair file generator 815 generates repair files and isolates the corrupted area(s) of the local file using the corrupted file and selected portions of the original file and remote repair file retrieved from storage 830.

Memory 820 stores data temporarily for use by the other components of the computer system 800. In one implementation, memory 820 is implemented as RAM. In one implementation, memory 820 also includes long-term or permanent memory, such as flash memory and/or ROM.

Storage 830 stores data temporarily or long term for use by the other components of the computer system 800, such as for storing selected portions of the original file and remote repair file retrieved from the server. In one implementation, storage 830 is a hard disk drive. Storage 830 stores information for use by the repair file generator 815, such as selected portions of the original file and remote repair file retrieved from the server. Storage 830 also stores data and data structures generated by the repair generator for future use, such as marked check codes.

The media device 840 receives removable media and reads and/or writes data to the inserted media. In one implementation, the media device 840 is an optical disc drive.

The user interface 850 includes components for accepting user input from a user of the computer system 800 and presenting information to the user. In one implementation, the user interface 850 includes a keyboard, a mouse, audio speakers, and a display. The controller 810 uses input from the user to adjust the operation of the computer system 800.

The I/O interface 860 includes one or more I/O ports to connect to corresponding I/O devices, such as external storage or supplemental devices (e.g., a printer or a PDA). In one implementation, the ports of the I/O interface 860 include ports such as: USB ports, PCMCIA ports, serial ports, and/or parallel ports. In another implementation, the I/O interface 860 includes a wireless interface for communication with external devices wirelessly.

The network interface 870 includes a wired and/or wireless network connection, such as an RJ-45 or "Wi-Fi" interface (802.11) supporting an Ethernet connection.

The computer system 800 includes additional hardware and software typical of computer systems (e.g., power, cooling, operating system), though these components are not specifically shown in FIG. 8B for simplicity. In other implementations, different configurations of the computer system can be used (e.g., different bus or storage configurations or a multi-processor configuration).

Figure 9:
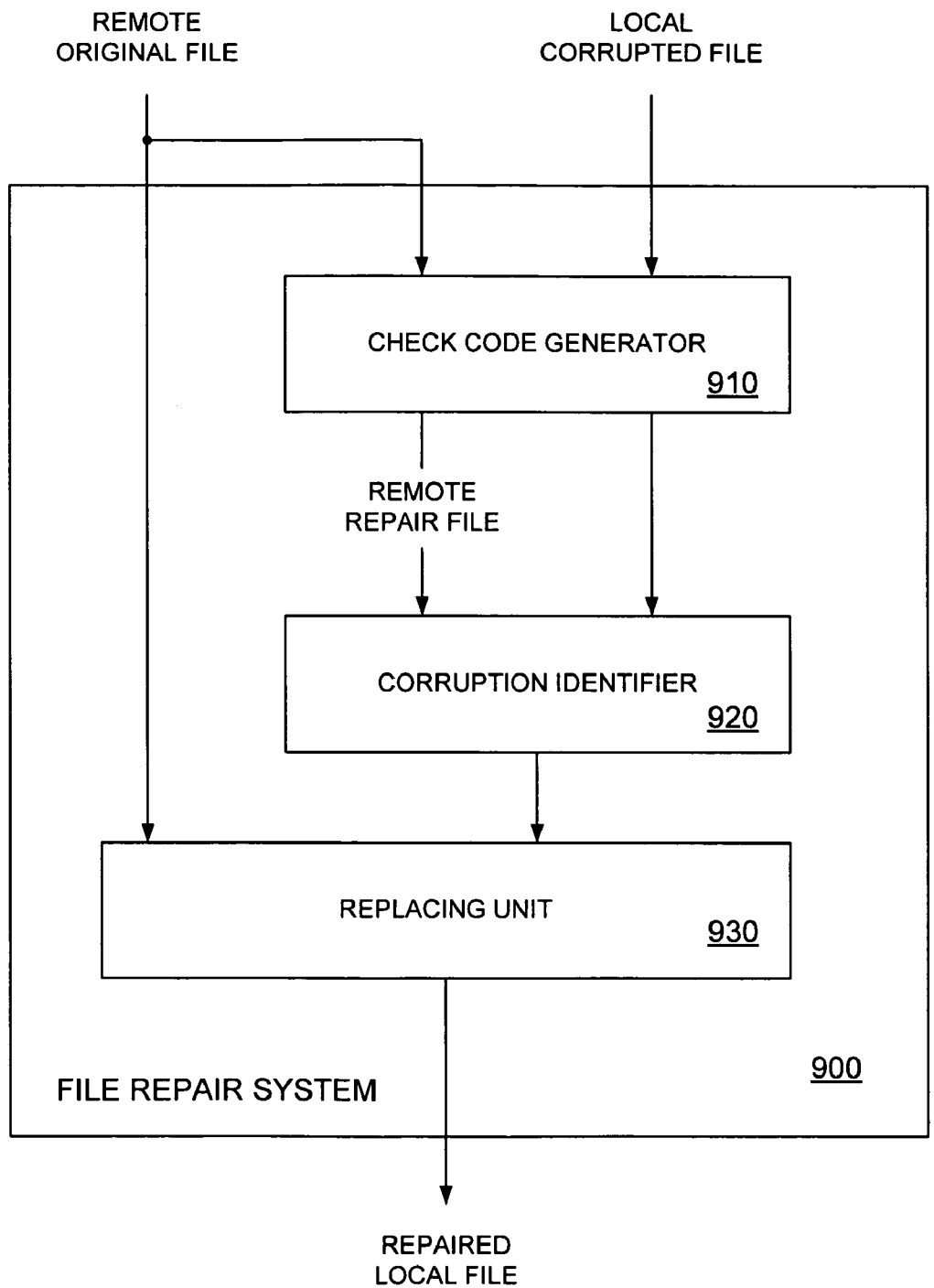
FIG. 9 shows a block diagram of a remote file repair system.

FIG. 9 show a block diagram of a file repair system 900. The system 900 includes a check code generator 910, a corruption identifier 920, and a replacing unit 930.

The check code generator 910 is configured to recursively generate a sequence of sections of check codes of a remote original file and a local corrupted file. The check codes of the remote original file produce a remote repair file. The corruption identifier 920 is configured to selectively retrieve parts of a remote repair file and a remote original file, based on detected corrupted parts of the sequence of recursively generated sections of check codes of a local file, to identify corrupted parts of the local corrupted file. The replacing unit 930 is configured to replace the corrupted parts of the local corrupted file with the retrieved parts of the remote original file.

It should be noted that the file repair system 900 could be used to update or change a version of a local file so that the system 900 can detect and selectively retrieve only the updated/changed section(s). For example, when a remote file has been upgraded from version A to version B, and it is desired to upgrade the local copy of version A to version B, the local copy of version A can be considered as a local corrupted file and version B of the remote file can be considered as a remote original file. Accordingly, the file repair system 900 will detect and selectively retrieve only the updated/changed section(s) of the remote original file while minimizing the amount of data downloaded from the remote server. Alternatively, the system can provide a list of part(s) to replace and the client can request or receive the updated parts for replacement.

Various implementations of the invention are realized in electronic hardware, computer software, or combinations of these technologies. Some implementations include one or more computer programs executed by a programmable processor or computer. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description refers to terms "server" and "client", the term "client" can refer to actions and files that are "local" while the term "server" can refer to actions and files that are "remote". In another example, data within server and/or local files may be compressed. Moreover, it may be desirable to use a rolling checksum to find blocks in the local file that match blocks in the remote file in the case of dropped or added bits. In another example, since repairing corruption in the file is similar to applying patches, it may be possible to replace delta-distribution (and indefinite server-side retention) in some or all cases. In yet another example, block sizes staggered or changed according to formulae dependent on the file size or likelihood of corruption. Accordingly, the present invention is not limited to only those implementations described above.

What is claimed is:

1. A method, comprising:
    recursively generating a sequence of sections of check codes of a local corrupted file to produce a local repair file;
    selectively retrieving at least one part of a remote repair file and at least one part of a remote original file, based on differences between at least one part of said local repair file and said at least one part of a remote repair file, to identify at least one corrupted part of said local corrupted file; and
    replacing said at least one corrupted part of said local corrupted file with said at least one part of said remote original file.

2. The method of claim 1, further comprising
    recursively generating a sequence of sections of check codes of said remote original file to produce said remote repair file.

3. The method of claim 2, further comprising
    concatenating said sequence of sections of check codes of said remote original file to produce said remote repair file.

4. The method of claim 1, wherein said recursively generating a sequence of sections of check codes of said local corrupted file includes:
    first hashing a first number of bytes in said local corrupted file to produce a check code having a second number of bytes, wherein said second number is less than said first number; and
    repeating said first hashing until said local corrupted file has been entirely hashed to produce a first plurality of check codes.

5. The method of claim 4, wherein said check code includes a cyclic redundancy check (CRC) code.

6. The method of claim 4, further comprising
    first concatenating said first plurality of check codes in the order in which they are produced to form a particular section of said sequence of sections of check codes of said local corrupted file.

7. The method of claim 6, wherein said particular section is a first generated remote check code section.

8. The method of claim 6, further comprising:
    second hashing said first number of bytes in said particular section to produce a check code having said second number of bytes; and
    repeating said second hashing until said particular section has been entirely hashed to produce a second plurality of check codes.

9. The method of claim 8, further comprising
    second concatenating said second plurality of check codes in the order in which they are produced to form another section of said sequence of sections of check codes of said local corrupted file.

10. The method of claim 9, wherein said another section of said sequence of sections is a last generated remote check code section in a time sequence.

11. The method of claim 9, further comprising
    moving to a previously generated section in a time sequence and designating said previously generated section as said particular section; and
    repeating said second hashing, said second concatenating, and said moving until the length of said another section is less than a threshold.

12. The method of claim 11, wherein said threshold is 2000 bytes.

13. The method of claim 1, wherein said sequence of sections of check codes of a local corrupted file includes a section of last generated local check codes in a time sequence.

14. The method of claim 13, wherein said selectively retrieving at least one part of a remote repair file and at least one part of a remote original file includes
    retrieving a section of last generated remote check codes in a time sequence of recursively-generated sections of check codes of a remote original file.

15. The method of claim 14, wherein said selectively retrieving at least one part of a remote repair file and at least one part of a remote original file includes
    comparing said section of last generated remote check codes to said section of last generated local check codes.

16. The method of claim 15, wherein said selectively retrieving at least one part of a remote repair file and at least one part of a remote original file includes
    marking check codes in said section of last generated local check codes that differ from said section of last generated remote check codes.

17. The method of claim 16, wherein said selectively retrieving parts of a remote repair file and a remote original file includes
    moving to previously generated sections of said time sequence of sections of check codes of a local corrupted file and said time sequence of sections of check codes of said remote original file;
    designating said previously generated sections as said last generated local check codes and said last generated remote check codes, respectively; and
    repeating said retrieving, said comparing, said marking, said moving, and said designating until said previously generated remote check code section in said time sequence of sections of check codes of said remote original file is a first generated remote check code section in said time sequence of sections of check codes of said remote original file.

18. The method of claim 17, wherein said selectively retrieving parts of a remote repair file and a remote original file includes
    downloading at least one part of said remote original file corresponding to said marked codes,
    if said previous remote check code section is a first generated remote check code section in said time sequence of sections of check codes of said remote original file.

19. The method of claim 1, further comprising
    using said local repair file and said remote repair file to locate a first corrupted part of said local corrupted file in a physical sequence from the beginning of said local corrupted file when the size of said local corrupted file does not match the size of said remote original file.

20. The method of claim 19, further comprising resynchronizing said local corrupted file and said remote original file starting from said located first corrupted part of said local corrupted file.

21. The method of claim 20, wherein said resynchronizing includes
replacing missing data and/or dropping added data between a last correct part before said first corrupted part and a resynchronized point.

22. The method of claim 21, further comprising
moving forward from said located first corrupted part one byte at a time by assuming that a current part of check codes is correct; and
comparing said byte of said current part of said local corrupted file to a byte in said remote original file corresponding to said located first corrupted part of said local corrupted file.

23. The method of claim 22, further comprising
discarding erroneously added bytes between said last correct part and a newly encountered part of said local corrupted file when said newly encountered part is encountered in said moving and comparing.

24. The method of claim 22, further comprising
making a note that at least one intervening block is dropped when said current part matches a block physically further along than a next physical block.

25. A system, comprising:
a first check code generator to recursively generate a sequence of sections of check codes of a local corrupted file to produce a local repair file;
a corruption identifier to selectively retrieve at least one part of a remote repair file and at least one part of a remote original file, based on differences between at least one part of said local repair file and said at least one part of a remote repair file, to identify at least one corrupted part of said local corrupted file; and
a replacing unit to replace said at least one corrupted part of said local corrupted file with said at least one part of said remote original file.

26. The system of claim 25, further comprising
a second check code generator to recursively generate a sequence of sections of check codes of said remote original file to produce said remote repair file.

27. The system of claim 26, further comprising
a concatenating unit to concatenate said sequence of sections of check codes of said remote original file to produce said remote repair file.

28. The system of claim 25, wherein said first check code generator includes:
a first hashing unit to hash a first number of bytes in said local corrupted file to produce a check code having a second number of bytes, wherein said second number is less than said first number,
said first hashing unit to repeat said hashing until said local corrupted file has been entirely hashed to produce a first plurality of check codes.

29. The system of claim 28, wherein said check code includes a cyclic redundancy check (CRC) code.

30. The system of claim 28, further comprising
a first concatenating unit to concatenate said first plurality of check codes in the order in which they are produced to form a particular section of said sequence of sections of check codes of said local corrupted file.

31. The system of claim 30, wherein said particular section is a first generated remote check code section.

32. The system of claim 30, further comprising:
a second hashing unit to hash said first number of bytes in said particular section to produce a check code having said second number of bytes,
wherein said second hashing unit repeats to hash said first number of bytes until said particular section has been entirely hashed to produce a second plurality of check codes.

33. The system of claim 32, further comprising
a second concatenating unit to concatenate said second plurality of check codes in the order in which they are produced to form another section of said sequence of sections of check codes of said local corrupted file.

34. The system of claim 33, wherein said another section of said sequence of sections is a last generated remote check code section in a time sequence.

35. The system of claim 33, further comprising
a looping unit to move to a previously generated section in a time sequence and designating said previously generated section as said particular section, and to repeat the operations of said second hashing unit, said second concatenating unit, and said looping unit until the length of said another section is less than a threshold.

36. The system of claim 35, wherein said threshold is 2000 bytes.

37. The system of claim 25, wherein said sequence of sections of check codes of a local corrupted file includes a section of last generated local check codes in a time sequence.

38. The system of claim 37, wherein said corruption identifier includes
a retriever to retrieve a section of last generated remote check codes in a time sequence of recursively-generated sections of check codes of a remote original file.

39. The system of claim 38, wherein said corruption identifier includes
a comparator to compare said section of last generated remote check codes to said section of last generated local check codes.

40. The system of claim 39, wherein said corruption identifier includes
a marking unit to mark check codes in said section of last generated local check codes that differ from said section of last generated remote check codes.

41. The system of claim 40, wherein said corruption identifier includes
a second looping unit to move to previously generated sections of said time sequence of sections of check codes of a local corrupted file and said time sequence of sections of check codes of said remote original file; and
a designating unit to designate said previously generated sections as said last generated local check codes and said last generated remote check codes, respectively, and to repeat the operations of said retrieving, said comparing, said marking, said moving, and said designating until said previously generated remote check code section in said time sequence of sections of check codes of said remote original file is a first generated remote check code section in said time sequence of sections of check codes of said remote original file.

42. The system of claim 41, wherein said corruption identifier includes
a downloading unit to download at least one part of said remote original file corresponding to said marked codes, if said previous remote check code section is a first generated remote check code section in said time sequence of sections of check codes of said remote original file.

43. The system of claim 25, further comprising
  a locator to use said local repair file and said remote repair file to locate a first corrupted part of said local corrupted file in a physical sequence from the beginning of said local corrupted file when the size of said local corrupted file does not match the size of said remote original file.

44. The system of claim 43, further comprising
  a resynchronizing unit to resynchronize said local corrupted file and said remote original file starting from said located first corrupted part of said local corrupted file.

45. The system of claim 44, wherein said resynchronizing unit includes
  a unit to replace missing data and/or drop added data between a last correct part before said first corrupted part and a resynchronized point.

46. The system of claim 45, further comprising
  a third looping unit to move forward from said located first corrupted part one byte at a time by assuming that a current part of check codes is correct; and
  a comparing unit to compare said byte of said current part of said local corrupted file to a byte in said remote original file corresponding to said located first corrupted part of said local corrupted file.

47. The system of claim 46, further comprising
  a discarding unit to discard erroneously added bytes between said last correct part and a newly encountered part of said local corrupted file when said newly encountered part is encountered in said moving and comparing.

48. The system of claim 46, further comprising
  a noting unit to make a note that at least one intervening block is dropped when said current part matches a block physically further along than a next physical block.

49. A computer program, stored in a tangible storage medium, for repairing a local corrupted file, the program comprising executable instructions that cause a computer to:
  recursively generating a sequence of sections of check codes of a local corrupted file to produce a local repair file;
  selectively retrieving at least one part of a remote repair file and at least one part of a remote original file, based on differences between at least one part of said local repair file and said at least one part of a remote repair file, to identify at least one corrupted part of said local corrupted file; and
  replacing said at least one corrupted part of said local corrupted file with said at least one part of said remote original file.

50. The computer program of claim 49, further comprising executable instructions that cause a computer to
  recursively generate a sequence of sections of check codes of said remote original file to produce said remote repair file.

51. The computer program of claim 50, further comprising executable instructions that cause a computer to
  concatenate said sequence of sections of check codes of said remote original file to produce said remote repair file.

52. The computer program of claim 49, wherein executable instructions that cause a computer to recursively generate a sequence of sections of check codes of said local corrupted file includes executable instructions that cause a computer to:
  first hash a first number of bytes in said local corrupted file to produce a check code having a second number of bytes, wherein said second number is less than said first number; and
  repeat said first hashing until said local corrupted file has been entirely hashed to produce a first plurality of check codes.

53. The computer program of claim 52, further comprising executable instructions that cause a computer to
  first concatenate said first plurality of check codes in the order in which they are produced to form a particular section of said sequence of sections of check codes of said local corrupted file.

54. The computer program of claim 53, further comprising executable instructions that cause a computer to
  second hash said first number of bytes in said particular section to produce a check code having said second number of bytes; and
  repeat said second hashing until said particular section has been entirely hashed to produce a second plurality of check codes.

55. The computer program of claim 54, further comprising executable instructions that cause a computer to
  second concatenate said second plurality of check codes in the order in which they are produced to form another section of said sequence of sections of check codes of said local corrupted file.

56. The computer program of claim 55, further comprising executable instructions that cause a computer to
  move to a previously generated section in a time sequence and designating said previously generated section as said particular section; and
  repeat said second hashing, said second concatenating, and said moving until the length of said another section is less than a threshold.

57. The computer program of claim 49, wherein said sequence of sections of check codes of a local corrupted file includes a section of last generated local check codes in a time sequence.

58. The computer program of claim 57, wherein executable instructions that cause a computer to selectively retrieving at least one part of a remote repair file and at least one part of a remote original file includes executable instructions that cause a computer to:
  retrieve a section of last generated remote check codes in a time sequence of recursively-generated sections of check codes of a remote original file.

59. The computer program of claim 58, wherein executable instructions that cause a computer to selectively retrieving at least one part of a remote repair file and at least one part of a remote original file includes executable instructions that cause a computer to:
  compare said section of last generated remote check codes to said section of last generated local check codes.

60. The computer program of claim 59, wherein executable instructions that cause a computer to selectively retrieving at least one part of a remote repair file and at least one part of a remote original file includes executable instructions that cause a computer to:
  mark check codes in said section of last generated local check codes that differ from said section of last generated remote check codes.

61. The computer program of claim 60, wherein executable instructions that cause a computer to selectively retrieving at least one part of a remote repair file and at least one part of a remote original file includes executable instructions that cause a computer to:
  move to previously generated sections of said time sequence of sections of check codes of a local corrupted file and said time sequence of sections of check codes of said remote original file;

designate said previously generated sections as said last generated local check codes and said last generated remote check codes, respectively; and repeat said retrieving, said comparing, said marking, said moving, and said designating until said previously generated remote check code section in said time sequence of sections of check codes of said remote original file is a first generated remote check code section in said time sequence of sections of check codes of said remote original file.

62. The computer program of claim 61, wherein executable instructions that cause a computer to selectively retrieving at least one part of a remote repair file and at least one part of a remote original file includes executable instructions that cause a computer to:

download at least one part of said remote original file corresponding to said marked codes, if said previous remote check code section is a first generated remote check code section in said time sequence of sections of check codes of said remote original file.

63. The computer program of claim 49, further comprising executable instructions that cause a computer to use said local repair file and said remote repair file to locate a first corrupted part of said local corrupted file in a physical sequence from the beginning of said local corrupted file when the size of said local corrupted file does not match the size of said remote original file.

64. The computer program of claim 63, further comprising executable instructions that cause a computer to resynchronize said local corrupted file and said remote original file starting from said located first corrupted part of said local corrupted file.

65. The computer program of claim 64, wherein executable instructions that cause a computer to resynchronize said local corrupted file and said remote original file includes executable instructions that cause a computer to:

replace missing data and/or dropping added data between a last correct part before said first corrupted part and a resynchronized point.

66. The computer program of claim 65, further comprising executable instructions that cause a computer to move forward from said located first corrupted part one byte at a time by assuming that a current part of check codes is correct; and compare said byte of said current part of said local corrupted file to a byte in said remote original file corresponding to said located first corrupted part of said local corrupted file.

67. The computer program of claim 66, further comprising executable instructions that cause a computer to discard erroneously added bytes between said last correct part and a newly encountered part of said local corrupted file when said newly encountered part is encountered in said moving and comparing.

68. The computer program of claim 66, further comprising executable instructions that cause a computer to make a note that at least one intervening block is dropped when said current part matches a block physically further along than a next physical block.

69. An apparatus, comprising:

means for recursively generating a sequence of sections of check codes of a local corrupted file to produce a local repair file;

means for selectively retrieving at least one part of a remote repair file and at least one part of a remote original file, based on differences between at least one part of said local repair file and said at least one part of a remote repair file, to identify at least one corrupted part of said local corrupted file; and means for replacing said at least one corrupted part of said local corrupted file with said at least one part of said remote original file.

* * * * *

UNITED STATES PATENT AND TRADEMARK OFFICE
CERTIFICATE OF CORRECTION

PATENT NO.        : 7,546,492 B2          Page 1 of 1
APPLICATION NO.   : 11/317496
DATED             : June 9, 2009
INVENTOR(S)       : Patrick McCuller It is certified that error appears in the above-identified patent and that said Letters Patent is hereby corrected as shown below:

On the Title Page, Item (73) Assignees:, please change "Sony Corporation, Tokyo (JP); Sony Pictures Entertainment Inc., Culver City, CA (US)" to -- Sony Online Entertainment LLC, San Diego, CA (US) --.

Signed and Sealed this
Ninth Day of September, 2014

Michelle K. Lee
*Deputy Director of the United States Patent and Trademark Office*